Figure 1:
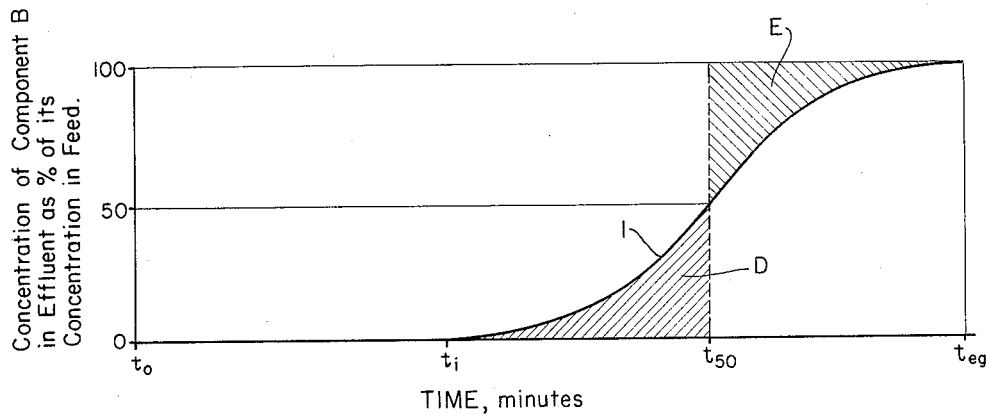

INVENTORS.
ARNOLD H. FAINBERG
MURRAY HAUPTSCHEIN
BY
ATTORNEY

INVENTORS.
ARNOLD H. FAINBERG
MURRAY HAUPTSCHEIN

ATTORNEY

Nov. 2, 1965   A. H. FAINBERG ETAL   3,215,747
METHOD OF SEPARATING TRIFLUOROETHYLENE
FROM TETRAFLUOROETHYLENE
Filed May 31, 1963

Fig.6

INVENTORS.
ARNOLD H. FAINBERG
MURRAY HAUPTSCHEIN
BY
ATTORNEY

"3,215,747
METHOD OF SEPARATING TRIFLUOROETHYLENE FROM TETRAFLUOROETHYLENE
Arnold Harold Fainberg, Elkins Park, and Murray Hauptschein, Glenside, Pa., assignors to Pennsalt Chemicals Corporation, Philadelphia, Pa., a corporation of Pennsylvania
Filed May 31, 1963, Ser. No. 284,442
6 Claims. (Cl. 260—653.3)

This invention relates to the separation of relatively small amounts of trifluoroethylene from tetrafluoroethylene by selective adsorption techniques.

In the production of tetrafluoroethylene by the high temperature pyrolysis of fluoroform ($CHF_3$) or difluorochloromethane ($CF_2HCl$) the raw product gases often contain small amounts of trifluoroethylene, $$(CF_2=CHF)$$

The amount of trifluoroethylene produced may range from trace amounts up to about 2% by weight (based on the weight of the $CF_2=CF_2+CF_2=CFH$ mixture).

In the polymerization of tetrafluoroethylene to high molecular polymers suitable for molding into end products of high thermal stability and chemical inertness it has been found that it is of great importance to reduce the concentration of trifluoroethylene in the monomeric tetrafluoroethylene to very low values such for example as to values of less than 40 parts per million and preferably less than 20 parts per million and even as low as one part per million or less by weight of trifluoroethylene. Concentrations of trifluoroethylene greater than about 10–40 p.p.m. deleteriously affect the properties of the polymer, in particular its thermal stability. Polytetrafluoroethylene prepared from monomer containing excessive amounts of trifluoroethylene tends to ethermally degrade at the relatively high temperatures necessary for fabrication of the polymer into molded shapes resulting, e.g. in undue porosity, loss of tensile strength, loss of dielectric properties, etc.

Because of the closeness of their boiling points and their close similarity in other respects, the separation of trifluoroethylene from tetrafluoroethylene down to such low residual trifluoroethylene concentrations is very difficult by known methods. Thus, methods such as fractional distillation, and liquid-liquid extraction and the like are impracticable for this purpose. Because of the high reactivity of tetrafluoroethylene, methods involving selective reaction of the trifluoroethylene to a more easily separable compound are likewise difficult or impossible to apply.

While it has been found that selective adsorption techniques using many common adsorbents such as silica gel, activated carbon and activated alumina, are capable of making the required degree of separation, we have discovered as will be shown below in more detail, that such adsorbents have such a low capacity in the adsorption process that their use is not economically attractive. Thus, adsorbents of these types, even at relatively low concentrations of trifluoroethylene such as one-half percent, are able to process only 0.1 to 0.5 pound of tetrafluoroethylene per pound of adsorbent before exhausting their adsorption capacity.

In recent years, a relatively new class of adsorbents have come into use, particularly in the field of selective hydrocarbon separation, consisting of crystalline metal aluminosilicates (often called zeolites) which in the dehydrated form have a three dimensional network of aluminum and silicon oxides forming intracrystalline voids interconnected by pores of uniform size, often referred to as zeolitic molecular sieves. The use of such adsorbents has been previously suggested for the separation of vinyl fluoride from vinylidene fluoride (see U.S. Patent 2,917,556 to Percival). In this previous work however it was found that the adsorption capacity of these materials in this separation was quite low. As will be shown in more detail hereafter, even at relatively low concentrations of vinyl fluoride, the capacity of the adsorbent was only about ½ pound of vinyl fluoride-free vinylidene fluoride per pound of adsorbent. This is about the same order of capacity that we have found for silica gel, activated carbon and activated alumina in the separation of trifluoroethylene. It was also found by Percival (U.S. Patent 2,917,556) that the capacity of the adsorbent was essentially independent of the initial concentration of vinyl fluoride, i.e. virtually the same adsorption capacity, in terms of weight of pure vinylidene fluoride produced per weight of adsorbent, was obtained at both low and relatively high concentrations of vinyl fluoride.

It has now been found in accordance with the present invention that, in surprising contrast to the behavior of the vinyl fluoride-vinylidene fluoride system as reported by Percival, the molecular sieve type crystalline metal aluminosilicates have a very high capacity for the separation of trifluoroethylene from tetrafluoroethylene (in many cases of the order of ten to thirty times greater than that for the separation of vinyl fluoride from vinylidene fluoride).

Furthermore, it has been found that such adsorbents are particularly effective for the selective adsorption of trifluoroethylene from mixtures of $CF_2=CF_2$ and $$CF_2=CHF$$

at relatively low initial concentrations of $CF_2=CHF$ viz. at initial $CF_2=CHF$ concentrations about 2% and less. Thus, it has been found that in contrast to the work reported by Percival for the vinyl fluoride-vinylidene fluoride system the capacity of molecular sieve type aluminosilicate adsorbents in the trifluoroethylene—tetrafluoroethylene system increases sharply at relatively low concentrations of trifluoroethylene (below about 2%) thus making the use of such adsorbents particularly attractive in the substantially quantitative removal of 2% and less of trifluoroethylene from tetrafluoroethylene.

The adsorbents used in the present invention may be described generally as crystalline metal aluminosilicates which in the dehydrated form have a stable three-dimensional network of $SiO_4$ and $AlO_4$ tetrahedra providing intracrylstalline voids which are interconnected by access openings or pores of uniform size. The effective pore diameter should be at least about 5 A. (angstrom units). The electrovalence of the tetrahedra containing aluminum is balanced by the inclusion in the crystal of a cation, in particular, alkali metal or alkaline earth metal cations, especially sodium, potassium and calcium ions. The total void volume after dehydration is generally of the order of about 50%. These adsorbents are often referred to generally as zeolitic molecular sieves.

While there are a number of natural crystalline zeolites such as chabazite which have the above type of crystal structure and which may act as molecular sieves, most of these natural materials are unavailable in commercial quantities in sufficiently pure form, and in addition most have effective pore diameters which are too small for use in the invention. For this reason the synthetic zeolitic molecular sieves are much preferred for use in the present invention. These synthetic materials and their method of manufacture are described in detail in both publications and in the patent literature. See for example Hersh, Molecular Sieves, Reinhold Publishing Corporation (1961) chapters 5–7; Breck et al., J.A.C.S. vol. 78 pp. 5963–5977; and U.S. Patents 2,882,243 and 2,882,244.

The type of synthetic zeolitic molecular sieves described in U.S. Patents 2,882,243 and 2,882,244 are particularly suitable for use in the invention. Adsorbents of these types are commercially available e.g. from the Linde Division of Union Carbide Corporation under the designations e.g. Molecular Sieve Types 5 A, 10 X and 13 X.

The preferred sieves are those in which the interstitial metal cations are alkali metal cations or those in which the original alkali metal cations have been replaced in whole or in part by alkaline earth metal cations. Particularly suitable are those in which the metal cations are sodium or calcium ions or both.

As pointed out previously the adsorbents used in the invention should have pore openings (i.e. the openings giving access to the intracrystalline voids) with an effective pore diameter of at least about 5 A. The effective pore diameter refers to the critical size of the smallest molecule which will be admitted through the pores as distinguished from the theoretical pore diameter formed by the framework of silica and alumina tetrahedra. Thus, Linde Molecular Sieve 5 A (for detailed description see Example II) has an effective pore diameter of about 5 A, will admit both tetrafluoroethylene and trifluoroethylene, and is highly effective in their separation. Linde Molecular Sieve 4 A on the other hand has an effective pore diameter of about 4 A and will admit neither of those olefins and is ineffective in their separation. There is on the other hand no critical upper limit in the effective pore size of the adsorbent. Thus, Linde Molecular Sieves 10 X and 13 X (for detailed description see Examples IV and I respectively) having effective pore sizes of about 10 A and 13 A respectively, are both highly effective in separating trifluoroethylene from tetrafluoroethylene in accordance with the invention. As is apparent from the foregoing, the separation process of the invention does not depend upon the screening of the two olefins according to size. Both enter the pores and are adsorbed on the surfaces of the intracrystalline voids as indicated by the fact that both trifluoroethylene and tetrafluoroethylene are taken up by sieves having effective pore diameters large enough to admit them in amounts of the order of 10 to 40% by weight of the adsorbent. Such a large take up could only be accounted for by the adsorption of the olefins on the large internal surfaces provided by the intracrystalline voids. The area of the internal surfaces are generally of the order of 500–800 square meters per gram in contrast to an external area of only 1 to 3 square meters per gram. Rather than depending upon screening by size, the separation of the two olefins according to the invention depends upon a differential adsorption effect with the trifluoroethylene being more strongly adsorbed than the tetrafluoroethylene. In this connection it is not more surprising that two materials as closely related as tetrafluoroethylene and trifluoroethylene should exhibit such a large differential adsorption (as demonstrated by the high capacity of the adsorbent for removing trifluoroethylene) particularly when the vinyl fluoride-vinylidene fluoride system exhibits such a low differential adsorption effect as demonstrated by the low capacity of the same adsorbents for separating vinyl fluoride from vinylidene fluoride.

The zeolitic molecular sieves are, of course, used in the activated anhydrous form, i.e. the crystal water has been driven off leaving intracrystalline voids. Suitable sieves are available in activated, essentially anhydrous (no adsorbed water) condition, containing only about 1 weight percent adsorbed air. If water is adsorbed prior to use by exposure, for example, to a humid atmosphere, the adsorbed water can be readily removed by heating the sieves at a temperature of the order of 350° C. while evacuating to low pressure or sweeping with a purge gas, e.g. air or nitrogen.

The zeolitic molecular sieves will be employed in any convenient physical form such as a powder or in the form of pellets. The pellet form is preferred from the standpoint of avoiding undue pressure drops through the system, for uniformity of flow, and ease of handling. Generally, pellets ranging from 1/16" to 1/4" in size will be found satisfactory. The pellets are usually prepared by formulating the zeolite with about 20% by weight of an inert binder and then compressing the mixture into pellets.

The capacity of an adsorbent in the separation of a two component mixture $A+B$ where B is the more strongly adsorbed component and is present in relatively minor amount, can be conveniently expressed in terms of the weight of pure A (i.e. A free from B) that can be obtained per unit weight of evacuated adsorbent at the time of initial breakthrough. By evacuated adsorbent is meant adsorbent that contains no adsorbed component. The capacity value in these terms is designated by the symbol X. The time of initial breakthrough ($t_i$) is the time which elapses after starting the flow of the $A+B$ mixture through a column of the adsorbent until the first trace of component B is detected in the column effluent. The value of $t_i$ is readily determined experimentally by monitoring the composition of the effluent to determine the time of appearance of the first trace of B. The value of X is calculated from the following relationship.

$$X = \frac{\mu t_i - w_i^T}{w_a}$$

where $\mu$ is the rate of feed of $A+B$ to the evacuated adsorbent in grams per minute; $t_i$ is the time of initial breakthrough in minutes; $w_i^T$ is the total weight in grams of $A+B$ which is adsorbed on $w_a$ grams of adsorbent at $t_i$ and where $w_a$ is the weight in grams of the evacuated adsorbent. The value of $w_i^T$ can be determined experimentally by measuring the weight gain of the evacuated adsorbent at $t_i$.

The capacity of the adsorbent in the separation of a two component mixture $A+B$ where B is the more strongly adsorbed component and is present in relatively minor amount, can also be expressed in terms of the weight of effluent obtained per unit weight of adsorbent at the time of 50% breakthrough. The capacity value in these terms is designated by the symbol Y. The time of 50% breakthrough is the time which elapses after starting the flow of the $A+B$ mixture through a column of the adsorbent until the concentration of B in the effluent is 50% of its concentration in the feed mixture of $A+B$. The value of $t_{50}$ is readily determined experimentally by monitoring the composition of the effluent to determine when the concentration of B has risen to 50% of its concentration in the feed composition. The value of Y is calculated from the following relationship:

$$Y = \frac{\mu t_{50} - w_{50}^T}{w_a}$$

where $\mu$, $t_{50}$ and $w_a$ are as defined above and where $w_{50}^T$ is the total weight in grams of $A+B$ which is adsorbed on $w_a$ grams of adsorbent at $t_{50}$. The value of $w_{50}^T$ can be determined experimentally by measuring the weight gain of the evacuated adsorbent at $t_{50}$.

The advantage of expressing the capacity in terms of Y (capacity based on 50% breakthrough, ($t_{50}$)) rather than in terms of X (capacity at initial breakthrough ($t_1$)) is that the value of Y more closely represents the maximum capacity value that can be attained in actual practice. Furthermore, the value of Y is virtually independent of feed velocity, column length, ratio of the column length to diameter, adsorbent particle size, adsorbent particle size distribution and adsorbent packing density.

As pointed out above, the value of Y closely approximates the maximum purification capacity attainable (in terms of weight of pure component A obtainable per unit weight of adsorbent). This results from the fact that the capacity at $t_{50}$ for most systems is essentially equivalent to the equilibrium purification capacity $Y_{eq}$ which is defined as the weight of pure component A obtainable per unit weight of adsorbent when the adsorbent is operated to the point at which it is unable to adsorb further quantities of component B, that is until the composition of the effluent from the adsorbent is the same as the composition of the feed. At this point the adsorbent is in equilibrium with the feed. The relationship of Y and $Y_{eq}$ can be better understood by reference to FIGURE 1, where the concentration of component B in the effluent from the adsorbent, expressed as the percent of its concentration in the feed, is plotted against time. From time $t_0$ (i.e. the start of feed to the activated adsorbent) to $t_1$ (time of initial breakthrough) the concentration of component B in the effluent is zero. During this time pure A is recovered. At $t_1$ the first trace of B appears in the effluent and from $t_1$ to $t_{eq}$ the concentration of B increases at the rate shown by curve 1 until at $t_{eq}$ the concentration of B in the effluent is 100% of its concentration in the feed. At this point the adsorbent is in equilibrium with the feed gas and no further separation of B from A will occur. At $t_{50}$ the concentration B in the effluent is 50% of its concentration in the feed. The amount of component B which has appeared in the effluent at $t_{50}$ is proportional to the shaded area D while the residual capacity of the adsorbent to remove component B from the mixture $A+B$ at $t_{50}$ is proportional to the shaded area E. If curve 1, defining the rate at which the concentration of B increases with respect to time, is symmetrical, as it is in FIGURE 1, then elapsed time $t_1$ to $t_{50}$ is the same as $t_{50}$ to $t_{eq}$, and the area D is equal to area E. In these circumstances, the amount of B which has appeared in the effluent at $t_{50}$ (represented by area D) is the same as the amount of B that can still be adsorbed by the adsorbent at $t_{50}$ (represented by area E). Thus, when curve 1 is symmetrical the maximum capacity, viz. the equilibrium capacity $Y_{eq}$ of the adsorbent (in terms of weight of pure A obtainable per weight of adsorbent) becomes equal to Y. Since in most cases curve 1 is approximately symmetrical in shape, Y can be generally taken for practical purposes as representing the maximum capacity (i.e. equilibrium capacity) of the adsorbent. Even in cases where curve 1 is somewhat a symmetrical the value of Y will generally closely approximate $Y_{eq}$.

EXAMPLES I TO IV

The following Examples I to IV illustrate the separation of trifluoroethylene from tetrafluoroethylene by selective adsorption on various types of zeolitic molecular sieves according to the invention and demonstrate the high purification capacities attainable. In each example the adsorbent in the form of $\frac{1}{16}''$ pellets containing about 20% by weight of an inert bonding material is loaded into a vertical tube with a 40 cm. length of packed section and an inside diameter of 2 cm. (length:diameter ratio of 20:1). The evacuated (no adsorbed component) weight of the adsorbent in each case is shown in Table I. In Example I, the adsorbent is a zeolitic molecular sieve of the type described in U.S. Patent 2,882,244 supplied by the Linde Division of Union Carbide Corporation under the designation Molecular Sieve Type 13 X. It has the general chemical formula $$0.83 \pm 0.05 Na_2O \cdot 1.00 Al_2O_3 \cdot 2.48 \pm 0.03 SiO_2 \cdot X H_2O$$

It has the X crystal structure which is cubic, $a_0 = 24.95$ angstroms, space group $$O_h^7 - Fd3m$$

and is characterized by a 3-dimensional network of $AlO_4$ and $SiO_4$ tetrahedra which after removal of crystal water form mutually connected intra-crystalline voids accessible through openings (pores) which will admit molecules with critical dimensions up to 9 A. The void volume is 51 vol. percent.

Table I

| Example | I | II | III | IV |
|---|---|---|---|---|
| Type of adsorbent | 13X | 5A | AW-500 | 10X |
| Evacuated weight of adsorbent, gms | 69.3 | 76.3 | 73.1 | 69.4 |
| Weight Percent $CF_2=CHF$ in feed | 0.45 | 0.41 | 0.41 | 0.43 |
| Mass flow of feed, grams/minute | 2.95 | 2.94 | 3.00 | 2.92 |
| Superficial linear velocity, ft./sec | 0.129 | 0.128 | 0.131 | 0.128 |
| Initial breakthrough time, $t_i$, min | 286 | 155 | 68 | 99 |
| 50% breakthrough time, $t_{50}$, min | 357 | 247 | 153 | 148 |
| Weight of $CF_2=CF_2+CFH=CFH$ on adsorbent after $t_i$, gms | 18.2 | 16.8 | 10.4 | 17.2 |
| Purification capacity X (i.e. at $t_i$) | 11.9 | 5.8 | 2.5 | 3.9 |
| Purification capacity Y (i.e. at $t_{50}$) | 14.9 | 9.3 | 6.3 | 6.0 | with an average volume of voids of about 0.38 cubic centimeters per gram. It has an internal surface area of 650–800 square meters per gram and an external surface area of 1 to 3 square meters per gram.

In Example II, the adsorbent is a zeolitic sieve of the type described in United States Patent 2,882,243 supplied by the Linde Division of Union Carbide Company under the designation Molecular Sieve Type 5 A. This adsorbent is prepared from Linde molecular sieve type 4 A by exchanging (through ion exchange) about 75% of the sodium ions of Linde Molecular Sieve Type 4 A for calcium ions. Linde Molecular Sieve Type 4 A, which is also of the type described in United States Patent 2,882,243, has the general chemical formula $$0.96 \pm 0.04 Na_2O \cdot 1.00 Al_2O_3 \cdot 1.92 \pm 0.09 SiO_2 \cdot X H_2O$$

Molecular sieve type 5 A has the A crystal structure which is cubic, $a_0 = 12.32$ A., space group $$O_h^1 - Pm3m$$

characterized by a three dimensional network of $AlO_4$ and $SiO_4$ tetrahedra which after removal of crystal water form mutually connected intra-crystalline voids accessible through openings (pores) which will admit molecules with critical dimensions up to about 5 A. in diameter. The void volume is about 45% with an average volume of voids of 0.27 cubic centimeters per gram. It has an internal surface area of 650 to 800 square meters per gram and external surface area of 1 to 3 square meters per gram.

In Example III, the adsorbent is a zeolitic molecular sieve supplied by the Linde Division of Union Carbide Company under the designation Molecular Sieve Type AW-500. This sieve is similar to the adsorbents used in Examples I, II and IV, being characterized by a three dimensional network of $AlO_4$ and $SiO_4$ tetrahedra which after removal of crystal water form mutually connected intra-crystalline voids accessible through openings (pores) which will admit molecules with critical dimensions of slightly less than about 5 A. It is resistant to acid attack and thus is specially adapted for use in acidic environments.

In Example IV, the adsorbent is a zeolitic molecular sieve of the type described in United States Patent 2,882,244 supplied by the Linde Division of Union Carbide Company under the designation Molecular Sieve Type 10 X. This is prepared from Linde Molecular Sieve Type 13 X, described above, by exchanging (through ion exchange) about 75% of the sodium ions of molecular sieve type 13 X for calcium ions. Type 10 X has the same crystal structure as Type 13 X and approximately the same void volume, but the pores are somewhat smaller and will admit molecules only with critical dimensions up to about 8 A. It has an internal and external surface area similar to that for Type 13 X.

In each of the examples, a mixture of tetrafluoroethylene and trifluoroethylene containing a concentration of trifluoroethylene as shown in Table I is introduced into the bottom of the vertical column of adsorbent at ambient temperature (25° C.). The pressure in the system is approximately atmospheric (15 p.s.i.a.). The adsorbents are employed as received in their air-loaded condition, the adsorbed air being immediately displaced when the flow of the mixture is started. The mixture is introduced into the column at a constant mass flow rate and superficial linear velocity as shown in Table I for each of the four runs.

The composition of the effluent gas from the column is continuously monitored by passage through a gas sampling valve of a gas chromatograph. By sampling and analyzing the effluent at frequent intervals, the time of initial breakthrough ($t_i$) and the time of 50% breakthrough ($t_{50}$) is determined for each run. The product from the adsorbent is collected in a liquid nitrogen cooled receiver.

At the outset, while the air is being desorbed and replaced by tetrafluoroethylene, the temperature of the column in the zone where desorption and replacement is taking place increases, and the warm zone travels up the column. After displacement of the air, the column cools to ambient temperature (25° C.) and continues at this temperature during the remainder of the operation. The heat of displacement of the tetrafluoroethylene by the trifluoroethylene is too small to exert any significant temperature effect because of the relatively small percentages of trifluoroethylene in the feed.

In each case, the time ($t_i$) of initial breakthrough of $CF_2=CHF$ is measured. This is taken at the time when the concentration of $CF_2=CHF$ in the effluent exceeds thirty parts per million. The time of 50% breakthrough ($t_{50}$) is also measured. The values of $w_i^T$ (total amount of $CF_2=CF_2$ and $CF_2=CFH$ adsorbed at $t_i$) and the value of $w_{50}^T$ (weight of $CF_2=CF_2$ and $CF_2=CFH$ on the adsorbent at $t_{50}$) are measured by the weight gain of the adsorbent. In practice, it is not necessary to measure these weight gains precisely at $t_i$ and $t_{50}$. After $t_i$ there is only a very small change in the total weight of $$CF_2=CF_2+CF_2=CFH$$

on the adsorbent. From the values shown in the table for the evacuated weight of the adsorbent, the mass flow rate, $t_i$, $t_{50}$, and the total weight of adsorbed $CF_2=CF_2$ and $CF_2=CHF$ on the adsorbent, the values for X and Y are determined and are shown in the table. As may be seen, at trifluoroethylene concentrations of the order of 0.4 weight percent, the purification capacity Y ranges from about 6 to 15 grams of trifluoroethylene-free tetrafluoroethylene per gram of adsorbent, while the capacity expressed in terms of X (capacity at initial breakthrough) is of the order of 3 to 12 grams of trifluoroethylene-free tetrafluoroethylene per gram of adsorbent.

The very high purification capacities attainable in accordance with the invention become apparent when compared to the purification capacities obtainable with other commonly used adsorbents such as silica gels, activated carbons and activated alumina. In the following examples (Examples A, B, C, D and E), a series of tests were made under conditions similar to those used in Examples I to IV to determine the capacity of silica gel, activated carbon, and activated alumina for the removal of trifluoroethylene from tetrafluoroethylene by selective adsorption. In each example, the adsorbent in the form of small pellets or granules is loaded into a vertical tube with a 40 cm. length of packed section and an inside diameter of 2 cm. (length:diameter ratio of 20:1). The evacuated (no adsorbed component) weight of the adsorbent is shown in Table II. In Example A the adsorbent is a granular silica gel having a total surface area of the order of 800 square meters per gram. In Example B, the adsorbent is a silica gel in the form of ¼" beads having a surface area of the order of 600 square meters per gram. In Example C, the adsorbent is an activated carbon obtained by the destructive distillation of bituminous coal and having a total surface area of the order of 1000 to 1200 square meters per gram and a pore volume of about 0.8 cubic centimeters per gram. In Example D, the adsorbent is an activated carbon obtained by the destructive distillation of coconut shells having a surface area similar to that of Example C. In Example E, the adsorbent is activated alumina consisting over 99% of alumina and low in sodium, iron and silica, and having a surface area of about 230 square meters per gram. A feed mixture of tetrafluoroethylene containing a small amount of trifluoroethylene is introduced into the bottom of the column at the mass flow rate and superficial linear velocity shown in Table II. The time at initial breakthrough and at 50% breakthrough are measured in the manner previously described. The weight of tetrafluoroethylene plus trifluoroethylene adsorbed after $t_i$ is also determined in the manner described above. The purification capacity X (at $t_i$) and Y (at $t_{50}$) is shown in Table II. As is apparent, the purification capacities obtainable with the use of the zeolitic molecular sieve type adsorbents is 20 to 100 times greater than with these other types of adsorbents.

*Table II*

| Example | A | B | C | D | E |
|---|---|---|---|---|---|
| Type of adsorbent | Silica gel | Silica gel | Activated carbon. | Activated carbon. | Activated alumina. |
| Evacuated weight of adsorbent, gms | 77.8 | 87.1 | 55.1 | 54.9 | 86.8. |
| Weight Percent $CF_2=CHF$ in feed | 0.44 | 0.45 | 0.44 | 0.44 | 0.43. |
| Mass flow of feed, grams/minute | 2.95 | 2.95 | 2.92 | 2.80 | 2.84. |
| Superficial linear velocity, ft./sec | 0.129 | 0.129 | 0.128 | 0.123 | 0.125. |
| Initial breakthrough time $t_i$, minutes | 5 | 4 | 8 | 9 | 3. |
| 50% breakthrough time $t_{50}$, minutes | 9 | 8 | 13.5 | 16.5 | 17. |
| Weight of $CF_2=CF_2+CF_2=CHF$ on adsorbent after $t_i$, gms | 8.9 | 8.0 | 18.0 | 21.6 | 5.4. |
| Purification capacity X (i.e. at $t_i$) | 0.1 | 0.05 | 0.1 | 0.1 | 0.04. |
| Purification capacity Y (i.e. at $t_{50}$) | 0.2 | 0.2 | 0.4 | 0.4 | 0.5. |

Figure 2:
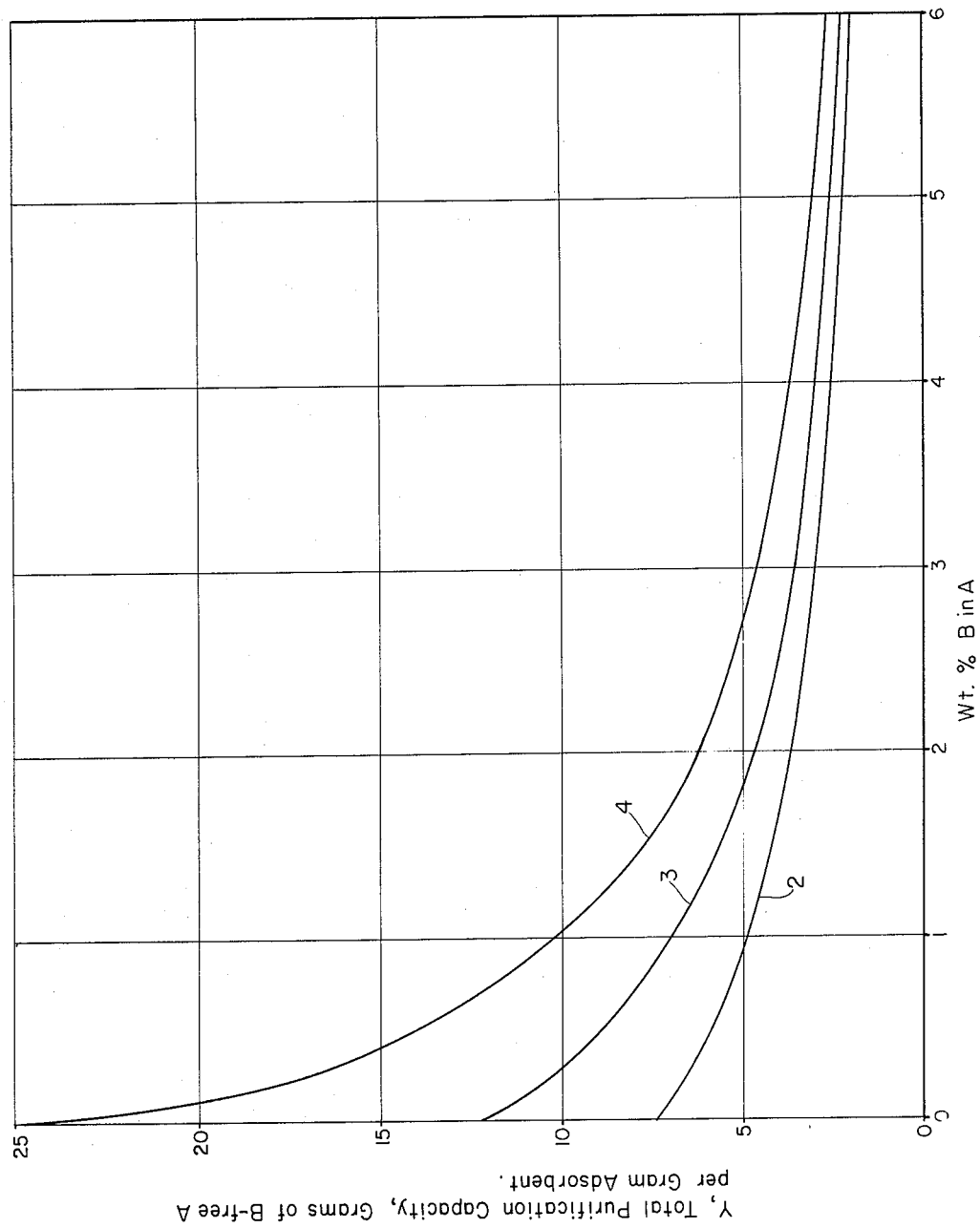
Figure 3:
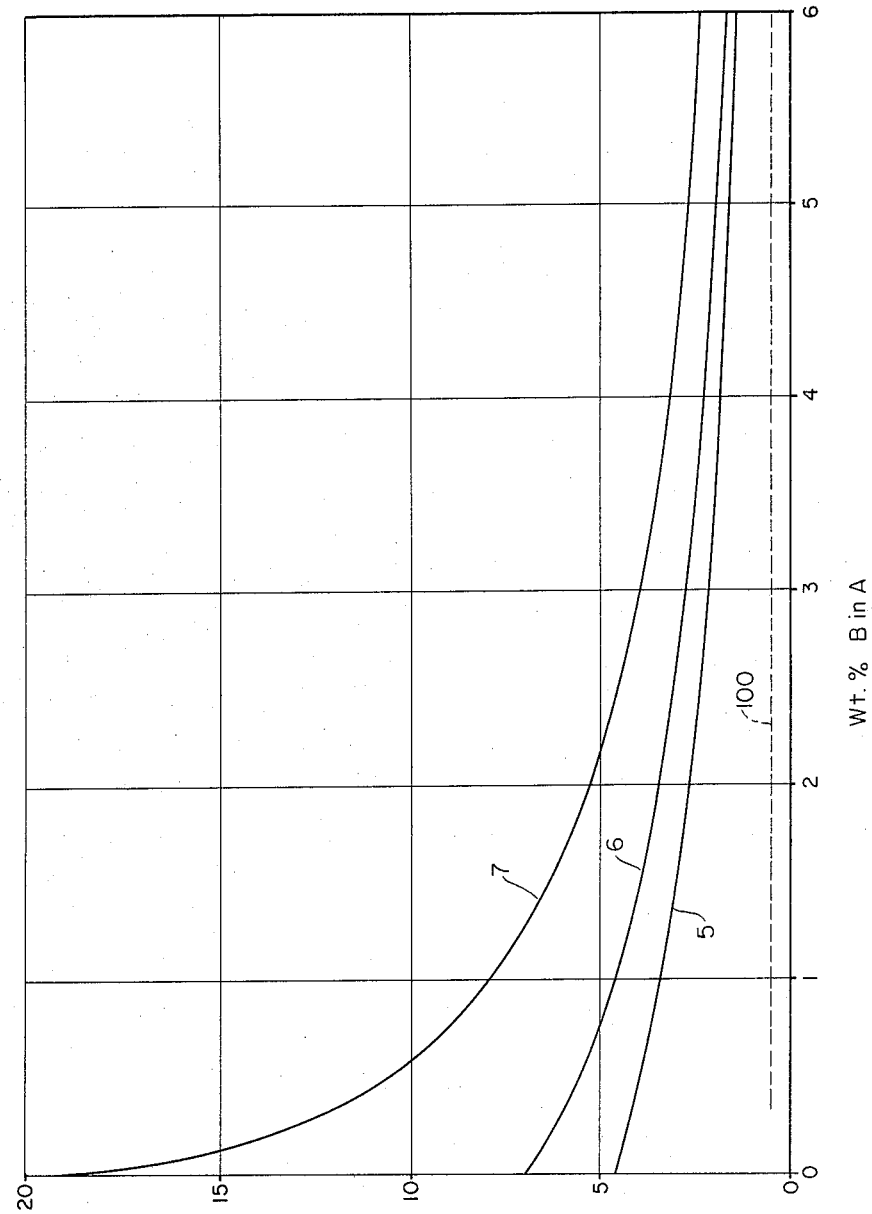

As mentioned previously, an important feature of the invention is the high capacity of the zeolitic molecular sieves for the removal of low initial concentrations of trifluoroethylene, viz. about 2% by weight and less, from tetrafluoroethylene. The manner in which the capacity of several types of zeolitic molecular sieves varies with respect to the initial concentration of trifluoroethylene in mixtures of $CF_2=CF_2$ and $CF_2=CFH$ containing from 0 to 6% of trifluoroethylene is shown in FIGURES 2 and 3. In FIGURE 2, curves 2, 3 and 4 show respectively the manner in which capacity varies with initial concentration of trifluoroethylene for molecular sieves Type 10 X, Type 5 A and Type 13 X, where capacity is expressed in terms of Y (i.e. at $t_{50}$). In FIGURE 3, curves 5, 6 and 7 show respectively the manner in which capacity varies with respect to initial trifluoroethylene concentration for molecular sieves Type 10 X, Type 5 A and Type 13 X, where capacity is expressed in terms of X (i.e. at $t_i$).

As is apparent from these curves, at initial trifluoroethylene concentrations over about 2% by weight, the capacity varies only slightly with respect to trifluoroethylene concentration, while in the case of trifluoroethylene concentrations of less than 2% capacity rises rapidly. The enhanced capacity of the zeolitic sieves for the removal of trifluoroethylene from tetrafluoroethylene at low initial concentrations of trifluoroethylene of 2% and less makes the process of the invention of particular value in this concentration region. Thus, the process of the invention is of great value in the ultra-purification of tetrafluoroethylene by the removal of 2% or less, and particularly for the removal of 1% or less, of trifluoroethylene from mixtures of $CF_2=CF_2$ and $CF_2=CFH$ down to low values of the order of 20 parts per million (by weight) and preferably to less than 10 parts per million of residual trifluoroethylene.

The enhanced capacity of the zeolitic sieves for the removal of trifluoroethylene from tetrafluoroethylene at low trifluoroethylene concentrations is in surprising contrast to the behavior displayed by vinylidene fluoride-vinyl fluoride mixtures using the same type of adsorbents, as reported by Percival in United States Patent 2,917,556. Reference is made to Table II which shows the capacities obtained by the use of zeolitic molecular sieves for the removal of vinyl fluoride from vinylidene fluoride in Examples 1 to 3 reported in United States Patent 2,917,556. The purification capacities obtained in the remaining examples of the patent are indicated to be substantially the same as those reported for Examples 1 to 3. The purification capacities are expressed in terms of X (i.e. at $t_i$) since this value can be calculated from the data reported by Percival, and is directly comparable to the value shown herein for the $CF_2=CF_2+CF_2=CFH$ system. It is apparent first of all that the purification capacities determined from Percival's data are much less at all impurity concentrations than those obtained for the $CF_2=CF_2+CF_2=CFH$ system in accordance with the invention. In the area of particular interest (i.e., impurity concentrations of about 2% and less) the differences between the respective purification capacities of the two systems are greatly different. For example, at an impurity level of about 0.5% the capacities obtained for the $CF_2=CF_2+CF_2=CFH$ system in accordance with the invention are more than twenty times greater than for the $CF_2=CH_2+CFH=CH_2$ system. In the second place, it can be seen that the capacity of the zeolitic sieves is essentially constant for the $CF_2=CH_2+CFH=CH_2$ system irrespective of the initial concentration of vinyl fluoride in the mixture. Enhanced capacity at relatively low concentrations of 2% and less is not obtained as in the case of the present invention. This is illustrated clearly in FIGURE 3 where curve 100 shows the manner in which the purification capacity X in Percival's system $CF_2=CH_2+CFH=CH_2$ varies with concentration at vinyl fluoride concentrations between about 0.5 to 6%. As may be seen, the capacity is virtually unchanged over this range.

In general, the adsorption separation process of the invention may be carried out at temperatures ranging from about $-50°$ C to $+50°$ C. and preferably from $-30°$ to $+30°$ C. It has been found that the capacity of the zeolitic molecular sieves increases at lower temperatures and a particularly preferred range of operating temperature is from $-20°$ to $+20°$ C.

Figure 4:
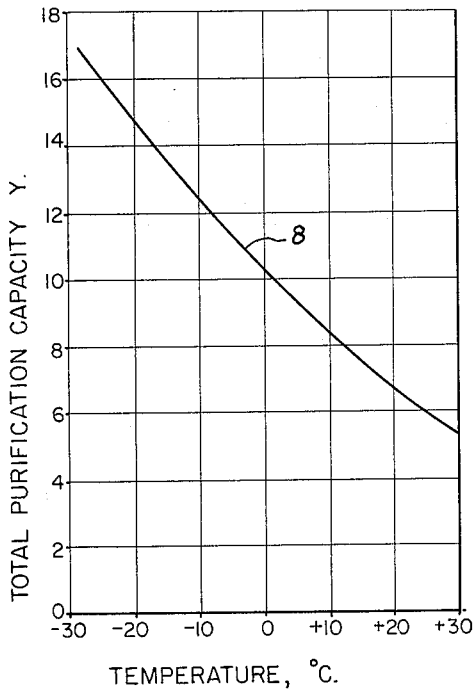

Examples V to VII inclusive which are summarized in Table IV, show the variation of purification capacity with respect to temperature for a Type 10 X molecular sieve at temperatures from $+20°$ to $-26°$ C. These examples were carried out in the same manner and using the same equipment as in previous Examples I to IV inclusive. As may be seen, the purification capacity Y (i.e., at $t_{50}$) of the sieve increases from 6.0 grams of trifluoroethylene-free tetrafluoroethylene per gram of adsorbent at $+25°$ C. to a capacity of 16.0 at $-26°$ C. The variation of capacity with respect to temperature for the Type 10 X sieve is shown graphically in FIGURE 4 where curve 8 shows the variation of capacity with temperature at constant pressure at temperatures of $-30°$ to $+30°$ C.

Aside from the fall off in capacity as the temperature increases, it is also desirable to avoid temperatures over about $+30°$ C. from the standpoint of minimizing the tendency of tetrafluoroethylene to polymerize on the zeolitic sieves.

*Table III*

REMOVAL OF VINYL FLUORIDE FROM VINYLIDENE FLUORIDE USING ZEOLITE MOLECULAR SIEVES (DATA FROM U.S. PATENT 2,917,566—W. C. PERCIVAL)

| Percival's Example No. | 1 | 2 | 3 |
|---|---|---|---|
| Type of Adsorbent | 13X | 13X | 13X |
| Evacuated weight of adsorbent, gms.[a] | 742.5 | 708 | 742.5 |
| Concentration of $CH_2=CHF$ in feed, mol percent | 6.4 | 0.61 | 23.2 |
| Concentration of $CH_2=CHF$ in feed, wt. percent | 4.7 | 0.44 | 17.9 |
| Superficial linear velocity, feet per sec | 0.167 | 0.167 | 0.167 |
| Mass flow of feed, grams per minute | 12.8 | 12.2 | 12.2 |
| Initial breakthrough time, $t_i$, minutes | 48 | 41 | 34 |
| Weight of $CH_2=CF_2+CH_2=CHF$ adsorbed after $t_i$, grams [b] | 150 | 143 | 150 |
| Purification Capacity X (i.e. at $t_i$) | 0.6 | 0.5 | 0.4 |

[a] Gross weight less weight of adsorbed air.
[b] Determined by measurement.

*Table IV*

| Example | V | VI | VII |
|---|---|---|---|
| Type of adsorbent | 10X | 10X | 10X |
| Temp., ° C | 25 | 0 | $-26$ |
| Pressure, p.s.i.a. | 15 | 15 | 15 |
| Evacuated weight of adsorbent, grams | 69.4 | 69.1 | 69.9 |
| Weight percent of $CF_2=CHF$ in feed | 0.43 | 0.42 | 0.42 |
| Mass flow of feed, grams per minute | 2.92 | 2.85 | 3.03 |
| Superficial linear velocity, ft./sec | 0.128 | 0.114 | 0.110 |
| Initial breakthrough time, $t_i$, minutes | 99 | 181 | 322 |
| 50% breakthrough time, $t_{50}$, minutes | 148 | 253 | 376 |
| Weight of $CF_2=CF_2+CF_2=CFH$ on adsorbent after $t_i$, gms | 17.2 | 19.0 | 21.0 |
| Purification capacity X (i.e. at $t_i$) | 3.9 | 7.2 | 13.7 |
| Purification capacity Y (i.e. at $t_{50}$) | 6.0 | 10.2 | 16.0 |

The pressure employed during separation is not critical in the sense of determining whether or not the separation will take place. Thus, subatmospheric pressures, normal pressures and super-atmospheric pressures may be employed. Super-atmospheric pressures greater than 300 p.s.i.a. (pounds per square inch absolute) are preferably avoided because of the greater tendency of tetrafluoroethylene to polymerize on the sieves at such pressures. Although sub-atmospheric pressures as low, for example as 5 p.s.i.a. may be employed if desired, it is generally more convenient to operate at normal or moderate super-atmospheric pressures. Although it has been found that the capacity of the sieve is not greatly pressure dependent, there is some capacity increase as the pressure increases from atmospheric to about 50 p.s.i.a. Since the tetrafluoroethylene will ordinarily be handled under pressure it will generally be convenient to operate at moderate super-atmospheric pressures.

Figure 5:
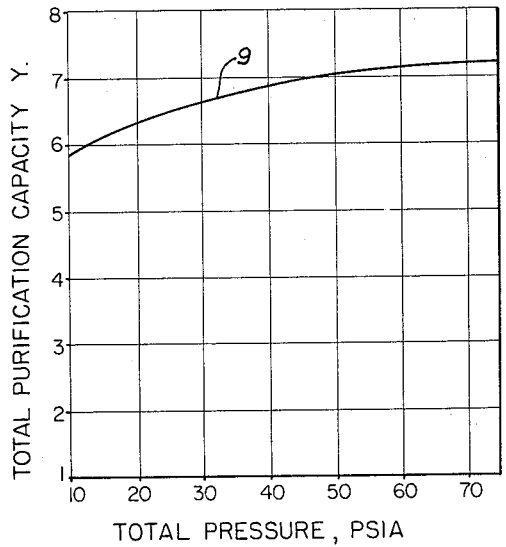

Examples VIII to X inclusive, which are summarized in Table V, show the variation in capacity at constant temperature of about 25° C. as the pressure increases from 15 to 75 p.s.i.a. for a 10 X type molecular sieve. These examples were carried out using the same equipment and the same procedures as described for the previous Examples I to IV. As may be seen, the purification capacity Y (i.e., at $t_{50}$) increased from 6.0 to 7.15. FIGURE 5 shows graphically the effect of increasing pressure on purification capacity in the range of 10 to 75 p.s.i.a. for a Type 10 X molecular sieve at constant temperature. Curve 9 showing this relationship illustrates the leveling off of the rate of capacity increase as the pressure increases over this range.

Another important feature of the invention is the ease and completeness with which the zeolitic molecular sieves can be regenerated (i.e. treated to remove the adsorbed components) so as to be suitable for repeated reuse. The regeneration may be effected in various ways. A preferred procedure is simultaneously to subject the ad- Table V

| Example | VIII | IX | X |
|---|---|---|---|
| Type of adsorbent | 10X | 10X | 10X |
| Temp., °C | 25 | 24 | 25 |
| Pressure, p.s.i.a | 15 | 29 | 75 |
| Evacuated wt. of absorbent, gms | 69.4 | 69.1 | 82.3 |
| Weight percent of $CF_2=CHF$ in feed | 0.43 | 0.42 | 0.37 |
| Mass flow of feed, grams/minute | 2.92 | 2.97 | 2.97 |
| Superficial linear velocity, ft./sec | 0.128 | 0.067 | 0.026 |
| Initial breakthrough time, $t_i$, minutes | 99 | 109 | 131 |
| 50% breakthrough time, $t_{50}$, minutes | 148 | 160 | 206 |
| Weight of $CF_2=CF_2+CF_2=CFH$ on adsorbent after $t_i$, grams | 17.2 | 18.5 | 24.8 |
| Purification capacity X (i.e. at $t_i$) | 3.9 | 4.4 | 4.4 |
| Purification capacity Y (i.e. at $t_{50}$) | 6.0 | 6.6 | 7.15 | sorbent to low pressures and elevated temperatures whereupon both of the adsorbed components i.e. tetrafluoroethylene and trifluoroethylene are desorbed. Elevated temperatures of from 150° to 350° C. and preferably from 180° to 300° C. and reduced pressures of one millimeter of mercury or less will generally be used. Where the concentration of trifluoroethylene in the feed is relatively low i.e. of the order of 2% or less, the adsorbent after saturation will contain a relatively high proportion of tetrafluoroethylene. The adsorbed tetrafluoroethylene may be recovered separately, with a desorption of only a small proportion of the trifluoroethylene adsorbed on the sieve, by a stepwise regeneration procedure in which the saturated sieve is first subjected to relatively low temperatures and reduced pressures to remove most of the less strongly adsorbed tetrafluoroethylene and only small amounts of the more strongly adsorbed trifluoroethylene, after which the temperature is raised and/or the pressure decreased to remove trifluoroethylene. The tetrafluoroethylene-rich effluent from the first stage containing only small proportions of trifluoroethylene may then be recycled to a fresh sieve, and in this way the tetrafluoroethylene content recovered. For example, a 10 X type molecular sieve after reaching saturation when used for the removal of approximately 0.4% trifluoroethylene from tetrafluoroethylene will release 98% of the adsorbed tetrafluoroethylene and only about 8% by weight of the adsorbed trifluoroethylene when subjected to evacuation to a pressure of 0.2 mm. Hg at a temperature of 25° C. The remainder of the trifluoroethylene may then be removed in a second stage by heating to a temperature of 180° C. at 0.2 mm. Hg for about 1 hour. The sieve is then cooled and subsequently pre-loaded with pure tetrafluoroethylene to the operating temperature and pressure. The sieve, thus regenerated, is highly effective and may be reused for the treatment of further quantities of impure tetrafluoroethylene (i.e. containing trifluoroethylene) to yield tetrafluoroethylene containing less than 2 p.p.m. of trifluoroethylene.

Other methods that may be used for regeneration of the zeolitic sieves include, for example, selective displacement of the tetrafluoroethylene by passing carbon dioxide through the sieve at room temperature. The displacement of the tetrafluoroethylene by the $CO_2$ is essentially quantitative, and only small quantities of trifluoroethylene are removed, such that the tetrafluoroethylene thus recovered is suitable for recycle to a fresh sieve for recovery of the tetrafluoroethylene content. Following the $CO_2$ treatment, the adsorbed $CO_2$ and trifluoroethylene may then be removed by purging with an inert gas such as nitrogen, preferably at an elevated temperature such as 150° C. to 300° C.

Still another regeneration method that may be employed is direct purging with an inert gas such as nitrogen at elevated temperatures of e.g. 150° C. to 300° C. The tetrafluoroethylene is quantitatively removed and the trifluoroethylene may be removed down to the required level. This latter method however has the disadvantage that the tetrafluoroethylene is difficult to recover from its admixture with nitrogen.

The Examples XI to XIII inclusive which are summarized in Table VI illustrate the successive regeneration and reuse of a Type 5 A molecular sieve for the purification of tetrafluoroethylene containing about 0.4 percent trifluoroethylene by weight. In Example XI a new sieve was employed while in Example XII the same sieve was employed after regeneration by evacuation to a pressure of about 0.25 mm. Hg and a temperature of about 250° C. for about 90 minutes. In Example XIII the same sieve was again employed after a second regeneration under similar conditions. The equipment and procedures employed in these examples were the same as those used in Examples I to IV. As may be seen, the purification capacity dropped only slightly on the first regeneration and remained essentially constant after the second regeneration.

Table VI

| Example | XI | XII | XIII |
|---|---|---|---|
| Type of adsorbent | 5A | 5A | 5A |
| Number of regenerations | (1) | (2) | (3) |
| Temp. °C | 25 | 25 | 25 |
| Pressure, p.s.i.a | 15 | 15 | 15 |
| Evacuated wt. of adsorbent, gms | 76.2 | 76.2 | 76.2 |
| Weight percent of $CF_1=CHF$ in feed | 0.41 | 0.42 | 0.44 |
| Mass flow of feed, grams/minute | 3.01 | 2.86 | 2.94 |
| Superficial linear velocity, ft./sec | 0.132 | 0.125 | 0.129 |
| Initial breakthrough time, $t_i$ | 155 | 140 | 134 |
| 50% breakthrough time, $t_{50}$ | 247 | 242 | 224 |
| Weight of $CF_2=CF_2+CF_2=CFH$ on adsorbent after $t_i$, grams | 16.9 | 17.0 | 16.9 |
| Purification capacity X (i.e. at $t_i$) | 5.9 | 5.0 | 4.9 |
| Purification capacity Y (i.e. at $t_{50}$) | 9.3 | 8.8 | 8.6 |

[1] New sieve.
[2] First regeneration.
[3] Second regeneration.

In large scale commercial operations it will be generally desirable to employ multiple columns of adsorbent arranged in series and suitably manifolded so that they may be successively operated to full capacity and successively regenerated. An example of a suitable arrangement is shown in FIGURE 6 wherein reference numerals 10, 11 and 12 refer to the columns of adsorbent. The raw feed (i.e. trifluoroethylene-containing-tetrafluoroethylene) is fed to the columns through line 13 and manifold 14. Manifold 14 is connected to each of the three columns by branch lines 15, 16 and 17 controlled by valves 15a, 16a and 17a respectively. The purified effluent from the adsorbent is removed by manifold 18 connected to the top of the columns by branch lines 20, 21 and 22 controlled by valves 20a, 21a and 22a respectively. Purified tetrafluoroethylene is withdrawn from the system by line 19 for any desired use.

To regenerate the adsorbent after saturation, the adsorbent columns 10, 11 and 12 are provided with heating and cooling means (not shown) by which the adsorbent can be heated to the desired regeneration temperature and subsequently cooled to operating temperature. Manifold 23 is provided at the top of the columns and is connected to the columns by branch lines 24, 25 and 26 controlled by valves 24a, 25a and 26a respectively for withdrawing desorbed material from the adsorbent during the regeneration cycle. Vacuum pump 27 is provided to reduce the columns to the desired regeneration pressure. Desorbed material may be removed from the system by line 28 controlled by valve 28a, while portions of it may be recycled to line 13 by line 29 controlled by valve 29a. Compressor 29b is provided to compress the recycled material to the pressure in line 13. At completion of regeneration, the adsorbent columns are cooled down to operating temperature and loaded with pure tetrafluoroethylene to operating pressure.

The top of each column is connected to manifold 33 at the bottom of the columns by branch lines 30, 31 and 32 which are controlled by valves 30a, 31a and 32a respectively. Manifold 33 is in turn connected by branch lines 34, 35 and 36, controlled by valves 34a, 35a and 36a respectively, to the bottom of the columns. By means of lines 30, 31 and 32, manifold 33, and lines 34, 35 and 36, the columns of adsorbent may be selectively interconnected with one another in series as will be described below.

At the beginning of the operation, when all the adsorbent is fresh, the raw feed is introduced through line 13 into column 1 through line 15 and valve 15a while purified effluent is taken off at the top of column 10 through line 20 and valve 20a and removed from the system through manifold 18 and line 19. During this period of operation all other valves are closed.

At some time before column 10 has reached its initial breakthrough point (i.e. before the concentration of trifluoroethylene in the effluent has reached some predetermined limit such as 10 parts per million) column 11 is placed in series with column 10 by closing valve 20a and opening valves 30a, 35a and 21a. Flow through column 10 is continued until the adsorbent therein has become fully saturated (i.e. the concentration of trifluoroethylene in its effluent has reached the concentration in the raw feed). At this point column 10 is ready for regeneration. Valves 15a, 20a, 30a and 35a are closed while valve 16a is opened to permit the raw feed to pass directly into the bottom of column 11. Column 10 is then placed in the regeneration cycle by heating the column, opening valves 24a and 28a and placing the column under vacuum through vacuum pump 27. At completion of regeneration, valve 29a is closed, and the column is cooled to operating temperature under vacuum, valve 24a is closed, and the adsorbent is loaded with pure tetrafluoroethylene to operating temperatures and pressure through line 20 and valve 20a. While regeneration of column 10 is proceeding, the purification proceeds in column 11 until it approaches initial breakthrough, at which time it is placed in series with column 12 by closing valve 21a and opening valves 31a, 36a and 22a. When column 11 has become fully saturated, it too is shut down and placed in the regeneration cycle in the manner described for column 10.

When column 12 approaches its point of initial breakthrough, it is then placed in series with column 10 by closing valve 22a and opening valves 32a, 34a and 20a. Column 10 by this time, has been regenerated and is ready for further purification duty. When column 12 is completely saturated, it too is shut down for regeneration in the manner previously described.

By thus successively interconnecting the columns in series the entire purification capacity of each of the columns may be utilized while at the same time obtaining an effluent of any desired purity. Any number of columns, of course, may be interconnected with one another in the manner shown to undergo successive purification and regeneration cycles.

During the regeneration, the first portions of the effluent, particularly where the regeneration is conducted in stages with an initial low temperature stage, will be rich in the more easily desorbed tetrafluoroethylene. This tetrafluoroethylene-rich, trifuoroethylene-lean portion may, if desired, be recycled to the system for recovery of the desorbed tetrafluoroethylene by line 29. In the second stage of the regeneration where the effiffluent is principally trifluoroethylene, the regeneration effluent may be withdrawn from the system by line 28.

The optimum rate of feed of the tetrafluoroethylene-trifluoroethylene mixture to the adsorbent is readily determined empirically. Generally, superficial linear velocities in the range of from 0.01 to 1.0 feet per second will be found satisfactory.

Under some conditions, such as operation at atmospheric pressures and reduced temperatures, e.g. 0° C. it will be possible to conduct the separation in the absence of a polymerization inhibitor for the tetrafluoroethylene. Under other conditions, on the other hand, such as operation at superatmospheric pressures, and/or at somewhat higher temperatures, it will be desirable to conduct the separation in the presence of an inhibitor such as dipentene or Terpene B or other terpenes of the type, for example, described in United States Patent 2,407,405. Since many of the molecular sieves tend to adsorb such inhibitors at least to some extent, in order to insure the presence of the inhibitor throughout the column of adsorbent, it is preferable to pretreat the adsorbent with inhibitor, such as by tumbling pellets of the adsorbent in an atmosphere of inhibitor vapor prior to changing the pellets into the adsorbent column. In this manner, the pellets are uniformly treated with the inhibitor such that inhibitor is present throughout the column. The presence of the inhibitor has no substantial effect upon the capacity of the adsorbent for the removal of trifluoroethylene from tetrafluoroethylene.

The separation of the trifluoroethylene from tetrafluoroethylene will occur in the presence of other components that are often found in the pyrolysis product produced by the pyrolysis of fluoroform or $CF_2HCl$ such as hexafluoroethane, $C_2F_6$, octafluoropropane, $C_3F_8$, fluoroform, $CHF_3$, pentafluoroethane, $C_2HF_5$, perfluorobutyne-2, $CF_3C{\equiv}CCF_3$, perfluoropropene, $CF_3CF{=}CF_2$, perfluorocyclobutane, $c\text{---}C_4F_8$, perfluorobutene-2

$$CF_3CF{=}CFCF_3, \text{ or } CF_2HCl$$

While the capacity for the removal of trifluoroethylene may be somewhat decreased by some of these impurities, its removal will nevertheless proceed in their presence.

It is to be understood that the foregoing specific embodiments and illustrative examples are given by way of illustration and that the invention is not limited thereto.

We claim:

1. A method for separating trifluoroethylene from tetrafluoroethylene which comprises contacting a mixture of tetrafluoroethylene and trifluoroethylene containing not more than 2% by weight of trifluoroethylene with a crystalline metal aluminosilicate having in the dehydrated form a stable, three-dimensional network of $SiO_4$ and $AlO_4$ tetrahedra containing interstitial metal cations, said network providing intracrystalline voids interconnected by pores having an effective diameter of at least about 5 A., thereby preferentially adsorbing said trifluoroethylene on said aluminosilicate, and recovering tetrafluoroethylene essentially free from trifluoroethylene.

2. A method in accordance with claim 1 in which the separation is carried out at a temperature of from −30° to +30° C.

3. A method in accordance with claim 1 in which the separation is carried out at a pressure of from 15 to 300 p.s.i.a.

4. A method for separating trifluoroethylene from tetrafluoroethylene which comprises contacting a mixture of tetrafluoroethylene and trifluoroethylene containing not more than 2% by weight of trifluoroethylene with a crystalline metal aluminosilicate having in the dehydrated form a stable, three-dimensional network of $SiO_4$ and $AlO_4$ tetrahedra containing interstital metal cations selected from the class consisting of alkali metal and alkaline earth metal cations, said network providing intracrystalline voids interconnected by pores having an effective diameter of at least about 5 A., thereby preferentially adsorbing said trifluoroethylene on said aluminosilicate, and recovering tetrafluoroethylene essentially free from trifluoroethylene.

5. A method in accordance with claim 4 in which said separation is carried out at a temperature of from −30° to +30° C.

6. A method in accordance with claim 4 in which said separation is carried out at a pressure of from 15 to 30 p.s.i.a.

References Cited by the Examiner

UNITED STATES PATENTS 2,917,556   12/59   Percival _____ 260—653.3

LEON ZITVER, *Primary Examiner.*

DANIEL D. HORWITZ, *Examiner.*

UNITED STATES PATENT OFFICE
CERTIFICATE OF CORRECTION

Patent No. 3,215,747            November 2, 1965

Arnold Harold Fainberg et al.

It is hereby certified that error appears in the above numbered patent requiring correction and that the said Letters Patent should read as corrected below.

Column 1, line 36, for "ethermally" read -- thermally --; column 2, line 18, after "roethylene" insert -- from tetrafluoroethylene --; column 4, line 37, for "valve" read -- value --; column 9, line 28, for "Table II" read -- Table III --; same column 9, in the heading to Table III, line 3 thereof, for "2,917,566" read -- 2,917,556 --; column 10, line 16, for "+20°" read -- +25° --; cqlumn 11, Table V, under the heading "Example", lines 5 and 10 thereof, for "$CF^2$", each occurrence, read -- $CF_2$ --; column 12, Table VI, first cqlumn, line 6 thereof, for "$CF_1$" read -- $CF_2$ --; column 13, line 16, for "column 1" read -- column 10 --.

Signed and sealed this 19th day of July 1966.

(SEAL)
Attest:

ERNEST W. SWIDER            EDWARD J. BRENNER
Attesting Officer            Commissioner of Patents